(12) United States Patent
Feiler (10) Patent No.: US 9,051,913 B2
(45) Date of Patent: Jun. 9, 2015

(54) PORTABLE HYDROELECTRIC KINETIC ENERGY CONVERSION DEVICE

(76) Inventor: Fred John Feiler, Oneonta, NY (US)

( * ) Notice: Subject to any disclaimer, the term of this patent is extended or adjusted under 35 U.S.C. 154(b) by 644 days.

(21) Appl. No.: 13/413,381

(22) Filed: Mar. 6, 2012

(65) Prior Publication Data

US 2013/0236314 A1 Sep. 12, 2013

(51) Int. Cl.
*F03B 3/12* (2006.01)
*F03B 11/02* (2006.01)
*F03B 17/06* (2006.01)

(52) U.S. Cl.
CPC .............. *F03B 11/02* (2013.01); *F03B 17/061* (2013.01); *F05B 2240/97* (2013.01); *F05B 2250/25* (2013.01); *F05B 2240/93* (2013.01); *Y02E 10/28* (2013.01)

(58) Field of Classification Search
CPC ...... B03B 17/06; B03B 17/061; Y02E 10/28; F05B 2240/97; F05B 2250/25; F05B 2240/93; F03B 11/02
USPC ................... 415/2.1, 3.1, 4.1, 4.3, 4.5, 7, 202, 415/208.1, 905, 906, 908; 416/176, 177; 290/43, 54
See application file for complete search history.

(56) References Cited

U.S. PATENT DOCUMENTS

| | | | | |
|---|---|---|---|---|
| 3,818,703 A * | 6/1974 | Lapeyre | ............................ | 60/504 |
| 3,986,787 A * | 10/1976 | Mouton et al. | ..................... | 415/7 |
| 4,025,220 A * | 5/1977 | Thompson et al. | ............... | 415/7 |
| 4,025,943 A * | 5/1977 | Chamberlain et al. | ........ | 257/446 |
| 4,746,808 A * | 5/1988 | Kaeser | ............................. | 290/52 |
| 6,409,466 B1 * | 6/2002 | Lamont | .......................... | 415/3.1 |
| 6,472,768 B1 * | 10/2002 | Salls | ................................ | 290/54 |
| 6,626,638 B2 * | 9/2003 | Rosefsky | ....................... | 415/4.3 |
| 7,018,166 B2 * | 3/2006 | Gaskell | .......................... | 415/4.3 |
| 7,044,711 B2 * | 5/2006 | Duncan, Jr. | ............... | 416/198 R |
| 7,063,579 B2 * | 6/2006 | Voves | ................................ | 440/3 |
| 7,258,523 B2 * | 8/2007 | Williams | ....................... | 415/2.1 |
| 7,291,936 B1 * | 11/2007 | Robson | ........................... | 290/43 |
| 7,298,056 B2 * | 11/2007 | Gizara | ............................. | 290/54 |
| 7,456,514 B2 * | 11/2008 | Ahmad | ........................... | 290/54 |
| 7,466,035 B1 * | 12/2008 | Srybnik et al. | .................. | 290/43 |
| 7,472,963 B2 * | 1/2009 | Jeong | .......................... | 297/463.1 |
| 7,600,963 B2 * | 10/2009 | Miller | ............................ | 415/4.3 |
| 7,633,174 B1 * | 12/2009 | Feiler | .............................. | 290/43 |
| 7,874,788 B2 * | 1/2011 | Stothers et al. | ................ | 415/4.5 |
| 7,938,622 B2 * | 5/2011 | Anderson, Jr. | .................... | 416/6 |
| 8,022,567 B2 * | 9/2011 | Davis et al. | ..................... | 290/54 |
| 2002/0088222 A1* | 7/2002 | Vauthier | ......................... | 60/398 |

(Continued)

FOREIGN PATENT DOCUMENTS

DE 2933907 A * 3/1981

*Primary Examiner* — Edward Look
*Assistant Examiner* — Jesse Prager (57) ABSTRACT

Disclosed herein is a crosscurrent tacking portable hydrokinetic energy conversion hydrofoil useful for generating electricity in moderate velocity currents and especially useful for rapid deployment and removal from a land base, boat or dock. The device comprises a buoyant and ballasted semi-cylindrical shroud containing a turbine rotor, annular cylindrical wing, a linear expansion nozzle, an alternator with linkages to a turbine shaft, an insulated conductor cable and tether lines. Hydrofoil elements enable the device to tack into a stream and hold a stable position. A system using two tether lines, each with one end connected to the device are fed into a stream to a desired distance from a surface base and are subsequently individually tensioned and fixed to a point on the base, stabilizing the device.

20 Claims, 5 Drawing Sheets

(56) References Cited

U.S. PATENT DOCUMENTS

| | | | |
|---|---|---|---|
| 2008/0211233 A1* | 9/2008 | Farrelly | 290/54 |
| 2009/0087301 A1* | 4/2009 | Krouse | 415/4.3 |
| 2010/0001529 A1* | 1/2010 | Rosefsky | 290/52 |
| 2010/0090473 A1* | 4/2010 | Glass | 290/55 |
| 2010/0123315 A1* | 5/2010 | Anderson, Jr. | 290/53 |
| 2010/0327583 A1* | 12/2010 | Hunt | 290/43 |
| 2011/0095530 A1* | 4/2011 | Blumer et al. | 290/43 |
| 2012/0013128 A1* | 1/2012 | Duke | 290/54 |

* cited by examiner

PORTABLE HYDROELECTRIC KINETIC ENERGY CONVERSION DEVICE

FIELD OF INVENTION

This invention relates to portable electric generating hydrokinetic energy conversion devices using horizontal axial flow turbines and more particularly to a partially shrouded device enabling crosscurrent positioning and rapid deployment and removal.

BACKGROUND OF INVENTION

In recent years around the globe, hydrokinetic energy conversion devices of many kinds have multiplied showing a wide range of inventive ideas intending to maximize efficiency of operation and cost effectiveness. The EERE Marine and Hydrokinetic Technology Database, November of 2011, includes 262 hydrokinetic devices of which 6% claimed to be tested in open water while another 5% are undergoing developmental testing. The EERE data also showed 4% were said to be grid connected and only one technology claimed to be commercially available. Other hydrokinetic technologies are known to exist, however, a point can be made given the EERE data that while the field is ripe with new invention, formidable obstacles stand in the way of development.

Calculating the production, installation and other associated costs of a new hydrokinetic technology may not produce an acceptable outcome in terms of cost per kilowatt hour in today's energy market, creating a challenge for investors to focus more on the long term environmental benefits than projecting the future financial returns. Large scale projects having enormous turbines generating a gigawatt of electricity would be economically more attractive and garner more hope for municipal use than multiple arrays of kilowatt producing turbines, but hydrokinetic technologies rising to such a grand scale need testing and development opportunities over a long term, beginning with models scaled proportionately to available funding. Grid connections for hydrokinetic technologies provide equally challenging obstacles and may be more economically feasible for large scale projects.

Another use for hydrokinetic energy conversion is found where flowing water is present in remote locations and where grid connections do not exist, are not desirable, or are prohibitively expensive. Small scale hydrokinetic energy conversion systems in this instance would be cost effective, efficient and a reliable means of providing clean electricity from renewable resources. River front property owners, boat owners, military operations, as well as maritime and scientific equipment would benefit from a broad range of hydrokinetic energy conversion devices suitable to their various needs. Small hydrokinetic energy conversion devices would be useful additions to battery bank systems also connected to solar and wind energy conversion devices.

There is a problem with the installation of many hydrokinetic energy conversion devices in that, the stream locations having favorably high flow velocities for viable energy conversion, often present unfavorable conditions for placing and maintaining the required substantial supporting structures, such as submerged pilings and anchors. Environmental concerns prefer not to alter the streambed and existing structures such as bridge abutments or dams may not be available or permissible for such use. A need exists for a portable crosscurrent positioning device for hydrokinetic energy conversion, particularly an electric generating device comprising a horizontal axial flow turbine usable in shallow depths with moderate velocity currents, that can be rapidly deployed and removed from a flowing stream, that does not require an operator to enter the stream and that does not require an anchor fixed to the stream bed. Electric generating hydrokinetic energy conversion devices are known to exist having various portability features and specific design features to aid performance and installation.

U.S. Pat. No. 3,986,787 for RIVER TURBINE, issued Oct. 19, 1976 to William J. Mouton, Jr., et al. discloses two parallel horizontal axial turbines, each centered in a primary canted annular nozzle benefiting from an effect of Venturi principle, and a secondary canted annular nozzle circumscribing the primary nozzle creating a passageway for an acceleration of mainstream flow effecting the exhaust of the primary nozzle. The turbines may be mounted beneath a floating platform and tethered to an anchored to the stream bed.

U.S. Pat. No. 4,025,943 for HYDRO-ELECTRIC GENERATOR, issued Jun. 3, 1980 to Philippe Vauthier discloses a device tethered to a stream bed using a shrouded fan in a flowing current, whereby the flowing current rotates the fan having hollow blades designed to entrain water and by centrifugal force supply a jet of accelerated water to the vanes of generators mounted in a circular tubing on the periphery of the turbine.

United States Published Patent Application No. 2002/0088222 for DUAL HYDROTURBINE UNIT WITH COUNTER-ROTATING TURBINES, filed Sep. 7, 2001 by Philippe Vauthier discloses a tethered device having two shrouded axial fan turbines fixed parallel to each other operating in counter rotation. Parallel fins arranged around the shrouds are connected perpendicularly to augmentor rings located on the outer trailing edge of each shroud to affect a low pressure zone around exit flow through the shrouds. A mechanically controlled ballast tank alters pitch of the device and by altering the resistance of one turbine fan or the other controls yaw of the device.

United States Published Patent Application No. 2011/0095530 for TETHERED AQUATIC DEVICE WITH WATER POWERED TURBINE, filed Oct. 26, 2009 by Eric Blumer, et al. discloses a method and device comprising a tethered hydrofoil wing with inboard and outboard elevons to control roll, pitch and yaw while preforming a figure eight maneuver submerged in a flowing current. A propeller blade turbine located on the trailing edge of the wing drives a generator while the path of travel increases the turbine speed relative to the flow velocity. The method discloses generating electricity by creating a path of movement within a flowing current with a device which comprises an insulated conductor tether which may be anchored to a point on land or sea.

U.S. Pat. No. 8,022,567 for UNDERWATER DUCTED TURBINE, issued Sep. 20, 2011 to Barry V. Davis, et al. discloses an apparatus for a turbine for generating electrical power from water or air flow comprises a rotor disk having hydrofoil blades, guide vanes, a cylindrical housing, and a generator means. A skirt augmenter device is fitted to the housing to reduce the Betz effect and a screen is added to prevent debris and marine life from entering the turbine.

U.S. Pat. No. 7,291,936 for SUBMERSIBLE ELECTRICAL POWER GENERATING PLANT, issued Nov. 6, 2007 to John H. Robson discloses a self-supporting device consisting of two side-by-side counter rotating horizontal axial turbines and a combination of a leverage system and pressure control system adjusting the hydrodynamic lifting forces to maintain constant depths. The device further comprises a torpedo shaped buoyancy tank and an airfoil shaped hydrofoil.

Similar United States patents that disclose hydrokinetic energy conversion devices include: U.S. Pat. No. 6,472,768 for HYDROKINETIC GENERATOR, issued Oct. 29, 2002 to Darwin Aldis Salls, U.S. Pat. No. 7,472,863 for SKY HOPPER, issued Jan. 6, 2009 to Steve Pak, U.S. Pat. No. 7,018,166 for DUCTED WIND TURBINE, issued Mar. 28, 2006 to Christopher Norman Gaskell, U.S. Pat. No. 6,409,466 for HYDRO TURBINE, issued Jun. 25, 2002 to John S. Lamont, U.S. Pat. No. 7,044,711 for HELICAL DEVICE FOR CONVERSION OF FLUID POTENTIAL ENERGY TO MECHANICAL ENERGY, issued May 16, 2006 to Ployed Jeffries Duncan, Jr., U.S. Pat. No. 7,456,514 KINETIC HYDROPOWER GENERATION FROM SLOW-MOVING WATER FLOWS, issued Nov. 25, 2008 to Jameel Ahmad, U.S. Pat. No. 7,874,788 for FLOW ENHANCEMENT FOR UNDERWATER TURBINE, issued Jan. 25, 2011 to Russell Stothers, et al., U.S. Pat. No. 7,298,056 for TURBINE-INTEGRATED HYDROFOIL, issued Nov. 20, 2007 to Andrew Roman Gizara, U.S. Pat. No. 3,818,703 for WAVE ENERGY CONVERTER ARRAY, issued Jun. 25, 1974 James M. Lapeyre, U.S. Pat. No. 6,626,638, for RIBBON DRIVE POWER GENERATION FOR VARIABLE FLOW CONDITIONS issued Sep. 30, 2003 to Jonathan B. Rosefsky, U.S. Pat. No. 7,063,579 for METHOD AND APPARATUS FOR RETRIEVING ENERGY FROM A FLOWING STREAM OF WATER, issued Jun. 20, 2006 to Joseph Voves, U.S. Pat. No. 7,258,523 for MEANS TO REGULATE WATER VELOCITY THROUGH A HYDRO ELECTRIC TURBINE, issued Aug. 21, 2007 to Herbert L. Williams, U.S. Pat. No. 4,025,220 for FLUID CURRENT TURBINE WITH FLEXIBLE COLLECTORS, issued May 24, 1977 to David F. Thompson, et al., U.S. Pat. No. 7,600,963 for FLUID ENERGY CONVERTER, issued Oct. 13, 2009 to Donald C. Miller, U.S. Pat. No. 4,746,808 for PORTABLE HYDROELECTRIC GENERATOR UNIT, issued May 24, 1988 to Charles Kaeser, U.S. Pat. No. 7,938,622 for TAPERED HELICAL AUGER TURBINE TO CONVERT HYDROKINETIC ENERGY INTO ELECTRICAL ENERGY, issued May 10, 2011 to Winfield Scott Anderson, Jr., U.S. Pat. No. 7,466,035 for TRANSPORTABLE HYDRO-ELECTRIC GENERATING SYSTEM WITH IMPROVED WATER PRESSURE, issued Dec. 16, 2008 to Simon Srybnik et al.

Similar published applications for United States Patents include: United States Patent Published Application No. 2010/0001529 for RIBBON DRIVE POWER GENERATION AND METHOD OF USE filed Jul. 2, 2009 by Jonathan B. Rosefsky, United States Published Patent Application No. 2010/0327583 for PITCH, ROLL AND DRAG STABILIZATION OF A TETHERED HYDROKINETIC DEVICE, filed May 27, 2010 by Turner Hunt, United States Published Patent Application No. 2008/0211233 for WATER TURBINE IN TETHERED ASYMMETRIC NOZZLE, filed May 4, 2006 by Francis Allen Farrelly United States Published Patent Application No. 2009/0087301 for MACHINE FOR INCREASED HYDRO POWER GENERATION, filed Sep. 27, 2008 by Wayne F. Krouse, United States Published Patent Application No. 2010/0090473 for POWER-AUGMENTING SHROUD FOR ENERGY-PRODUCING TURBINES, filed Oct. 15, 2009 by Ben Glass.

None of these patents or publications individually or in any combination disclose or suggest the novel portable electric generating hydrokinetic energy conversion device of the present invention disclosed here in.

SUMMARY OF INVENTION

In accordance with the present invention disclosed herein, there is provided a portable electric generating device comprising a permanent magnet alternator driven by a horizontal axial flow turbine which converts kinetic energy in flowing liquid to rotational energy of a turbine shaft. Linkages, such as a belt and pulley system deliver the rotational energy needed for turning the alternator to produce electricity. In other applications the turbine may be coupled to another machine such as a pump, compressor, etc.

The portable electric generating device of the present invention is launched into a flow sliding on its keel and a runner. A self-filling ballast chamber submerges the device dispersing a water weight of approximately 95% of the total weight of the device. Flowing water is met at the first instance by a vertically elongated bow stem having a thin airfoil in a proximate portion of the device, dividing the main stream flow into two general zones in accordance with Bernoulli law, resulting notably in a pressure difference vertically oriented to the two sides. The one side, being designated to reduced pressure and accelerated flow, is comprised of an elongated flat laminar-flow plane having convex surfaces defining the outer horizontal limits. A keel mounted to the convex surface of the lower semi-cylinder provides an additional foil and stability.

The other side of the device, being vertically asymmetrical and designated overall to increased pressure, comprises a linear expansion nozzle segment transition ing a thin airfoil to an inside surface of a semi-cylinder having a diameter smaller than the measure of the mouth of the expansion nozzle. The concavity of the semi-cylinder shrouds a portion of a horizontal axial flow turbine and more particularly a helically shaped auger-type floating water turbine. The turbine is held within the shrouded portion by a central shaft having a proximal end and a distal end, each end comprising bearings and brackets disposed to the concavity of the semi-cylinder.

One objective of the invention is to increase flow velocity into the turbine by Venturi effect and subsequently attain an improved flow through helical concavities of the turbine rotor.

Another objective of the invention is to control crosscurrent tacking using two tether lines, one providing thrust, and the other providing control of the angle of attack within a vertical orientation. The first tether line is connected to the device at a given center of pressure producing an angle of attack sufficient to climb in a given range of flow velocity. The second tether line is connected to the bow stem to reduce the angle of attack increasing the efficiency of the turbine while maintaining a constant position in the flow. Additionally, an annular cylindrical wing, being larger in diameter than the concavity of the semi-cylinder, is disposed distally thereon providing vertical and horizontal stabilizing assistance and a rudder effect to assist the angle of attack.

It is still another objective of the present invention to use the buoyancy provided by the floating water turbine in combination with additional buoyancy located in the upper regions of the device to submerge the floating water turbine and the shrouding portion below the water line, giving the device of the present invention a total volume displacing an amount of water weighing approximately 95% of the weight of the device.

BRIEF DESCRIPTION OF THE DRAWINGS

A complete understanding of the present invention may be obtained by reference to the accompanying drawings, when considered in conjunction with the subsequent, detailed description, in which.

For the purpose of clarity and brevity, like elements and components will bear the same designations and symbols throughout the FIGURES.

DESCRIPTION OF THE PREFERRED EMBODIMENT

The preferred embodiment is a device useful for an individual operator to generate electricity produced by converting kinetic energy in flowing water to rotational energy which drives a permanent magnet alternator. Disclosed herein is a description of the preferred embodiment and the operation thereof.

Figures 1, 1A, 1B:
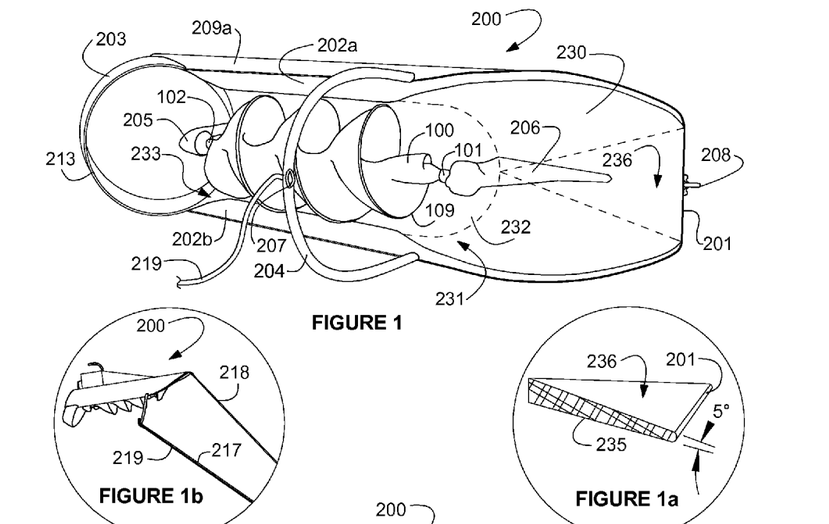
FIG. 1 is a perspective first side view of the portable hydroelectric kinetic energy device of the present invention.
FIG. 1a is a detail perspective cross-sectional view of the device shown in FIG. 1.
FIG. 1b is a second side view of the device shown in FIG. 1.
Figures 5, 5A, 5B:
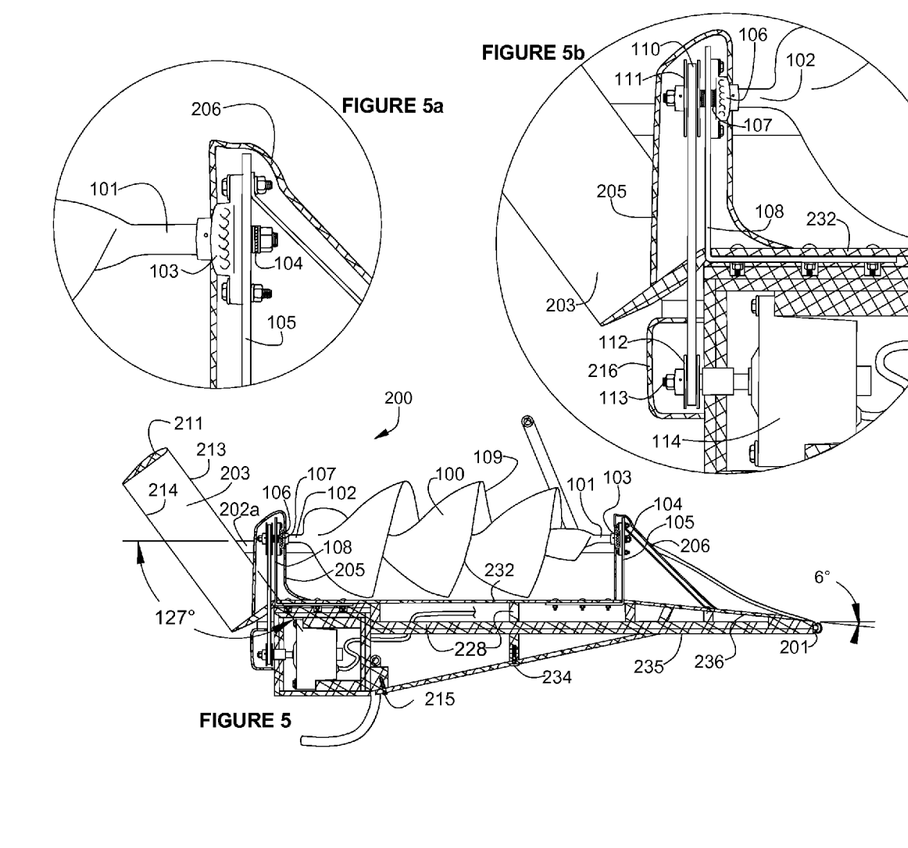
FIG. 5 is a second opposing side cross-sectional view of the presentation invention shown in FIG. 1.
FIG. 5a is an enlarged view of a protruding shaft at a proximal end of the device shown in FIG. 5.
FIG. 5b is an enlarged view of a protruding shaft at a distal end of the device shown in FIG. 5.

Referring to FIG. 1, there is shown a 7/8 perspective first side view of the preferred embodiment having an elongated central structure with an approximate relative length to height to width proportion of 25/9/4, generally at reference number 200, FIG. 1a showing a detailed perspective view of a tapered leading edge of device of FIG. 1, FIG. 1b showing a second side of device of FIG. 1 having tether lines attached thereto, FIG. 5, showing a second opposing side cross-sectional view revealing a frame structure 228 and placement of parts therein, FIG. 5a showing a magnification detail view of a proximal turbine shaft end 101 of FIG. 5 and FIG. 5b showing a magnification detail view of a distal turbine shaft end 102 having linkages to an alternator 114 of FIG. 5.

The device 200 having horizontal symmetry comprises a turbine 100, such as U.S. Pat. No. 7,633,174 for FLOATING WATER TURBINE FOR A POWER PLANT, issued Dec. 15, 2009 to Fred John Feiler. The volume of the said floating water turbine displaces an amount of water weighing from approximately 40% to 90% of the weight of the turbine contributing buoyancy to the present invention. As previously stated, it is an objective of the present invention to use said buoyancy of said floating water turbine in combination with additional buoyancy found in device 200, completely submerging floating water turbine 100 to improve its efficiency. Buoyancy not found in other turbines may be compensated by increasing buoyancy within device 200. It will be recognized that other turbines could be chosen to meet particular operating circumstances. Consequently, the invention contemplates and includes any suitable turbine.

Turbine 100 is maintained centrally positioned within a partial shroud, semi-cylinder 232, comprises a longitudinal axis having a protruding shaft 101 at a proximal end thereof and a distal protruding shaft end 102, each end comprising respectively, proximal bracketed axial bearing 103, proximal thrust bearing 104 and proximal bracket 105, distal bracketed axial bearing 106, distal thrust bearing 107 and distal bracket 108 disposed at the midline of the long axis of semi-cylinder 232, having brackets pass through the inside surface and are fastened to the convex side of the said semi-cylinder. Semi-cylinder 232 provides a partial shroud to contain pressure created by a partial linear expansion nozzle 230 thereby increasing the efficiency of turbine 100. A nacelle shield 206 is centered longitudinally on the expansion nozzle 230 covering proximate said bracket and bearings. Using a partial shroud 232 to contain spilling over of a flow within turbine 100 and a partial linear expansion nozzle 230 to increase flow velocity into the turbine by Venturi effect, reduces the weight and profile associated with full coverage and allows the leading edge 109 of the helical rotor of turbine 100 to be influenced by the mainstream flow.

The proximate end of semi-cylinder 232 transitions at area 231 to the linear expansion nozzle 230 having at its widest point an increased measurement of approximately 33% to 45% of the diameter of semi-cylinder 232 and a gradual radial taper to a bow stem 201. A portion of the linear expansion nozzle forms a flat Isosceles triangular area 236 having its base disposed at the bow stem 201 and its apex ramping approximately from 5 to 10 degrees shown in FIG. 1a at an angle of 5 degrees disposed to the midpoint of the arc at the proximate end of semi-cylinder 232 producing a tapered leading edge at bow stem 201. Said linear expansion nozzle 230, having a liner dimension at the long axis of approximately 26% to 50% of the total length of the device, comprises upper and lower funneled concavities having smooth surfaces continuous with flat triangular area 236 and are disposed at the edges of rails 202a and 202b.

Said rails 202a and 202b symmetrically shaped comprises: proximal ends disposed at opposite ends of said bow stem 201, linear edges disposed at the sides of 170 degree semi-cylinders 209a and 209b, other linear edges disposed at the edges of said linear expansion nozzle 230 and said semi-cylinder 232 and a distal end disposed at an annular cylindrical wing 203. Said symmetrical rails 202a and 202b further comprise a proximal parabolic curve, a transition 231 at the juncture of the proximate arc endpoints of semi-cylinder 232 to flat planes horizontally inclined within a range of 85 degrees to 180 degrees and shown in FIG. 4 inclined at an angle of 118 degrees adjacently toward a horizontal axis, and a distal transition area 233 to said annular cylindrical wing 203. The inclined angles of the rails add to the laminar flow area and aid in directing fluid pressure to effect the turbine rotation. It will be recognized that any diameter or length may be chosen for the semi-cylinder and further recognized that other angles, arcs, ratios and proportions may be chosen for the semi-cylinder, rails and linear expansion nozzle to meet a particular operating circumstance or environment. Consequently, the invention comprehends any changes to specific measurements, ratios and proportions in keeping with the spirit of the invention.

Figure 6:
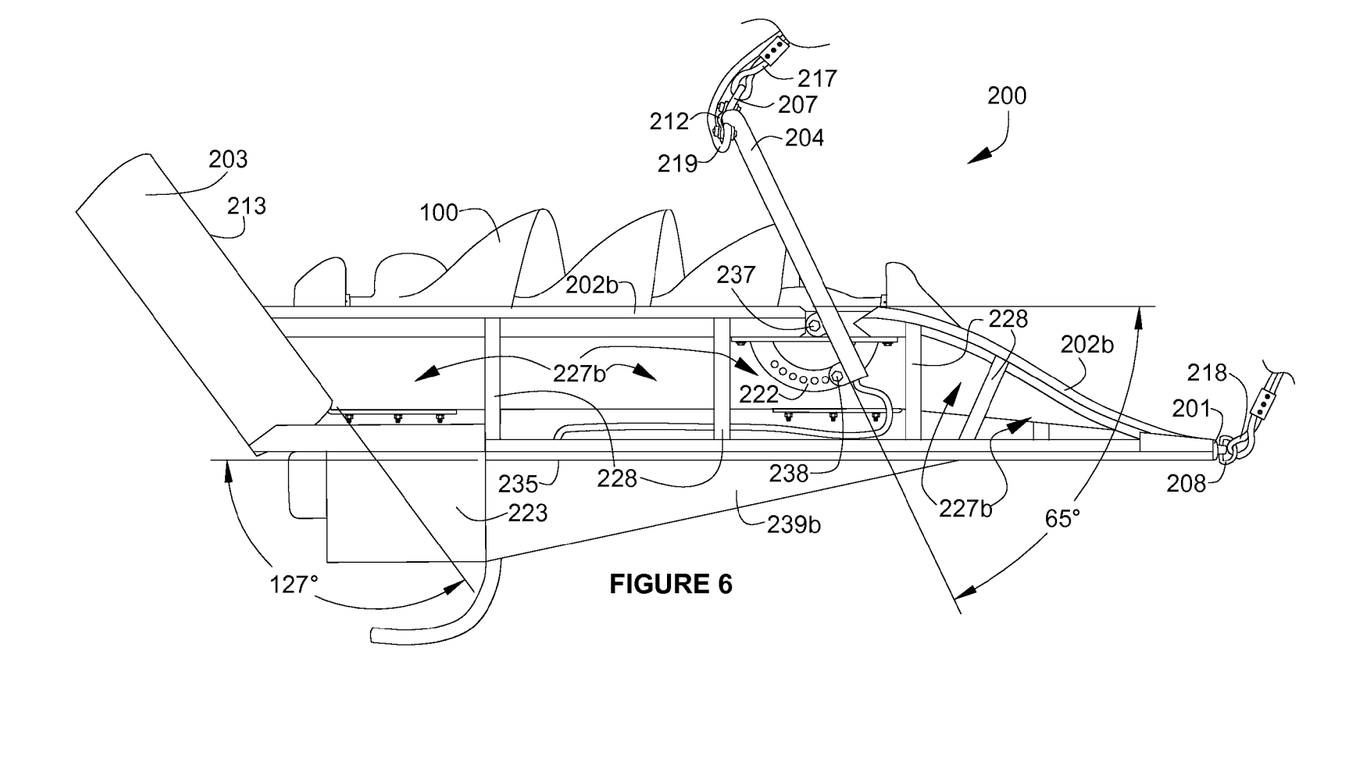
FIG. 6 is an enlarged view of a second opposing side of the device shown in FIG. 1.

The preferred embodiment shows that on the distal outer edges of said rails 202a and 202b, disposed distally at an angle within a range of 90 degrees to 135 degrees to said elongated flat laminar-flow plane and shown in FIG. 5 and FIG. 6, at an angle of 127 degrees to the longitudinal axis of the device, is disposed the leading edge 213 of an annular cambered wing 203 with an approximate, (plus or minus 1), camber 211 according to NACA 4-digit Series: 4 (maximum camber in % chord), 4 (position of maximum camber in 1/10 of c), 12 (max thickness in % of chord). The preferred embodiment also shows said annular cambered wing 203 comprising a cylinder having an approximate inside diameter 33.33% larger than the diameter of semi-cylinder 232 and having a chord width 9.5% of the length of its circumference. Said annular cambered wing provides stability and lift to device 200. It will be recognized that other proportions may be chosen for the wing cylinder to meet a particular operating circumstance or environment. Consequently, the invention comprehends an annular cambered wing having any wing angle fixed or adjustable with any varying camber, cord width or annular dimension.

FIG. 6 is a second opposing side view of FIG. 1, having semi-cylinder 209b removed, showing a supporting frame structure 238 and placement of parts therein. A tether bar 204 comprises a semi-circular pipe with one end passing through rail 202a and the other end passing through rail 202b, offset distally, shown disposed at an angle of 65 degrees to the long axis and fastened to a frame structure within the device by angle adjustment retainers 222 comprising sheer fasteners 238. The tether bar 204 protruding from within the device contains an insulated conductor cable 219 emerging from a hole at the distal midpoint of the arc of said tether bar 204. A tether line 217 connecting ring 207 is fastened to the midpoint of tether bar 204 with clamp 212. The location of the connecting ring of the preferred embodiment provides the device with an angle of attack of 12 degrees in a mainstream flow and with 100% tension on tether line 217, transfers the energy of the flow to lift created by device 200 into an upstream tack in accordance with Bernoulli law. Tensioning the second tether line 218 connected to ring 208 at said bow stem reduces the angle of attack thereby increasing the efficiency of the turbine while maintaining a constant position in the flow. Tether bar 204 having an offset angle of 65 degrees on a pivot point 237 at the intersection with the rails may be adjusted to another angle, thereby changing the angle of attack. It will be recognized that such adjustment may be made to suit other operating conditions by relocating shear fastener 238 on angle adjustment retainers 222, or by other means not shown, such as a servomechanism, mechanical or other electrically actuated mechanism connected to the end regions beyond the pivot point 237 at the rail intersection of said tether bar 204.

It will further be recognized that shear pins, springs or other break-away mechanisms, not shown, may be used to allow device 200 to pivot toward tether bar 204 when excessive force is applied to tether line 217. In the event of an excessive flow velocity or being struck by an object, device 200 will lose its predetermined angle of attack and drift downstream tethered on a radial path from the anchor point.

Figure 2:
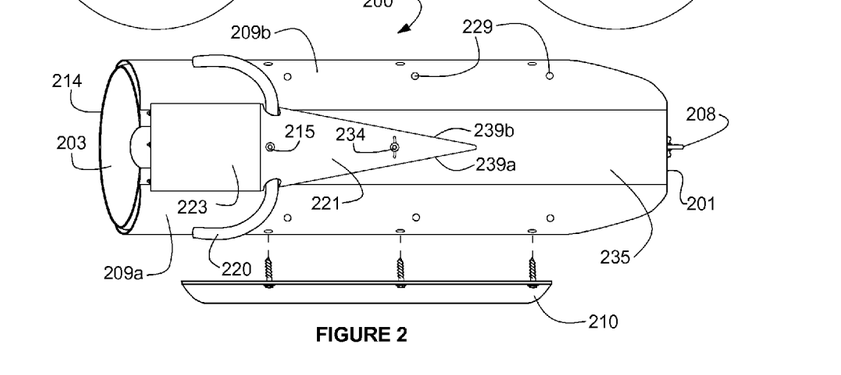
FIG. 2 is a first opposing side view of the of the present invention shown in FIG. 1.

Referring to FIG. 2, there is shown a first opposing side view of the present invention of FIG. 1 in a flipped position showing semi-cylinder 209a as the lower portion of the device. Semi-cylinders 209a and 209b are produced from linear convex sections of tubing having symmetrically tapered proximate sections, each forming respective adjacent ramps of approximately 23 degrees. Said semi-cylinders 209a and 209b comprising side edges disposed at the edges of said rails, form upper and lower portions of device 200 having opposite edges deposed tangentially to the longitudinal edges of a flat plane 235. Said semi-cylinders 209a and 209b having proximal ends disposed at said bow stem ends and distal ends forming trailing edges disposed at the extremity of said elongated body. The preferred embodiment further shows semi-cylinders 209a and 209b having arcs measuring approximately 170 degrees. The flat plane 235 having sides disposed at said cylinders 209a and 209b, having a proximate end at bow stem 201 and a distal end disposed at the alternator cowling, comprises a height approximately 42% of the total height of the device providing a laminar flow surface. An additional 21.4% of the surface of flat plane 235 is provided by removable keel 210 disposed at a parallel plane on the arc of semi-cylinder 209a approximately 130 degrees from the adjoining edge of plane 235. It will be recognized other height ratios of flat vs. curved surface area may be used for conditions requiring a change in the laminar flow area and, or, floatation area and consequently may require a change in the diameter and arc of semi-cylinders 209a and 209b. Such changes will be considered within the scope of the present invention.

Centrally disposed from the distal end of flat plane 235 and extending to the midsection is shown a cowling 223 containing a permanent magnet alternator and an adjustable horizontal stabilizing nacelle 221 comprising a long taper and flat side planes adjacent to an angle from approximately 16 to 25 degrees disposed perpendicular to the flat laminar plane 235. Stabilizing nacelle is adjustable by means of pivot fastener 215 and anchor fastener 234 to aid in stabilizing a horizontal position in a flow. Runners 220 connected to a frame section at the proximal end of alternator cowling 223 protrude from the nacelle. The specific alternator forms no part of the present invention which includes any and all suitable alternator types and styles. It will be recognized by those of skill in the art that many permanent magnet alternators may be used and may require dimensional changes to the cowling 223 and stabilizing nacelle 221. Nacelle and cowling may be constructed using rectangular and triangular flat planes, or cylindrical and conical shapes, in either case the said adjustable nacelle 221 comprises flat side planes 239a and 239b perpendicular to the flat plane 235 and adjacent to an angle of approximately 0 to 20 degrees.

Figure 3:
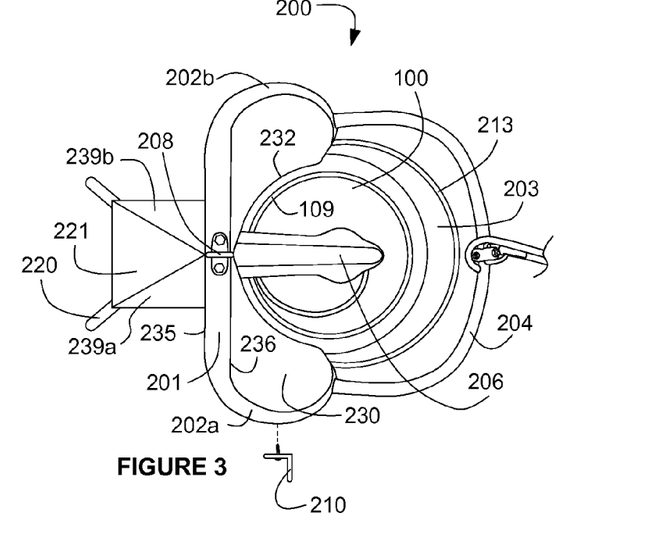
FIG. 3 is a proximal perspective view of the present invention shown in of FIG. 1.

Referring to FIG. 3, there is a proximal perspective view of the present invention of FIG. 1 showing leading edges of the proximate end of the device 200 having vertical asymmetry. Turbine 100 comprising leading edge 109 centrally located in the semi-cylinder 232 is shown to have a diameter 4% smaller than the inside diameter of semi-cylinder 232. Linear expansion nozzle 230 shows the upper and lower funneled concavities with surfaces disposed at the sides of the flat Isosceles triangular area 236 shown in FIG. 1a. Bow stem 201 having one edge disposed at the base of triangular area 236 and the other edge disposed radially at the laminar surface of flat plane 235, forms the leading edge of the present invention. The combined surfaces produce a linear laminar foil producing pressure differences displaced laterally. The liner expansion nozzle 230 shows the area which produces an increased flow velocity introduced into the proximate end of the graduated helical portion of the turbine 100. Annular cylindrical wing 203 shows leading edge 213 having a diameter 33.33% larger than the diameter of semi-cylinder 232.

Referring back to FIG. 6, centered on the bow stem 201 to support tether line 218 is a connecting ring 208 fastened through said bow stem into a frame structure within the device. The bow stem having rounded edges is joined by rails 202a and 202b having flat surfaces. The frame 228 comprises ribs and beams to support the outer surfaces and may be constructed from wood, plastics, metal, composites, or any combination of such materials. Space for floatation and or, ballast is provided within the frame sections 227a and 227b.

Figure 4:
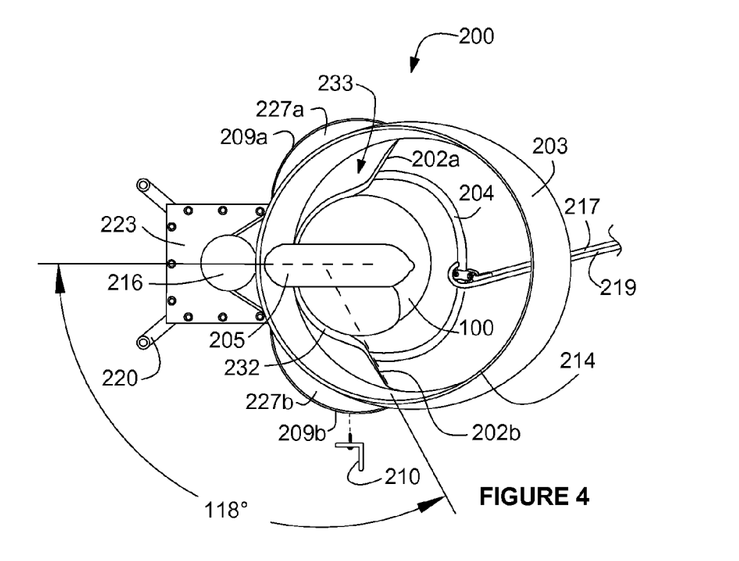
FIG. 4 is a distal perspective view of the present invention shown in FIG. 1.

Now referring to FIG. 4, there is a distal perspective view of the present invention of FIG. 1 showing a trailing edge of a plurality of flight components at the distal end of the device in a flipped position in relation to FIG. 3, having a removable keel 210 relocated to semi-cylinder 209b. Chamber area 227a extending to the proximate end of the device comprising sections between frame members contain floatation and an equal chamber area 227b respectively, having sections between frame members contain ballast water. Holes 229 shown in FIG. 2 are provided in semi-cylinders 209a and 209b to allow air to escape from the upper sections and water to flow into the lower sections. An air bladder system may be used having connecting tubing to opposite sections of 227a and 227b, partially filled with air, maintain buoyance in the upper sections by ballast water filling the lower sections, compressing the airbladder and forcing the contained air into the upper chamber. Closed cell foam may be used additionally, or in place of air bladders for flotation requiring repositioning of foam to opposite side sections for operating the device in a flow from an opposite direction. Removable keel 210 also repositioned to the opposite side provides additional ballast and aids in maintaining the desired position of the device while taking on ballast water.

The device 200 comprising all its parts and components, is designed to have a combined weight less than or equal to the weight of the volume of water displaced thereby. In the embodiment chosen for the purpose of disclosure, the volume displaces an amount of water weighing approximately 95% of the total weight of the device. It will be recognized that other predetermined ratios of weight vs. weight-of-displaced-water could be chosen to meet a particular operating circumstance or environment. Consequently, the invention comprehends a volume displacing an amount of water weighing within a range of 80% to 100% of the weight of the device. The device may, therefore, be made from wood, plastics, expanded polymer foam, composites, rubber, metal or any other material that satisfies this buoyancy requirement. The exposed surface areas of the device must be smooth, durable and resilient to withstand impact. It will be also recognized that many of the identified components of the device may be a unified structure.

Referring back to FIGS. 5 and 5b annular cylindrical wing 203 having a leading edge 213, trailing edge 214 and camber 211 is disposed at the distal end of the concavity of semi-cylinder 232 at an angle within a range of 90 degrees to 135 shown at an angle of 127 degrees to the longitudinal axis of the preferred embodiment. A belt 110 passing through the chord of wing 203 links a drive pulley 111 on the central shaft of turbine 100, covered by a shield 205, to a driven pulley 112 on an alternator shaft 113, covered by shield 216, thereby transferring the rotation of turbine 100 to the alternator 114. It will be recognized by those skilled in the art that other methods and mechanisms for transferring the rotation of a drive shaft to a driven shaft may be implemented.

Figure 7:
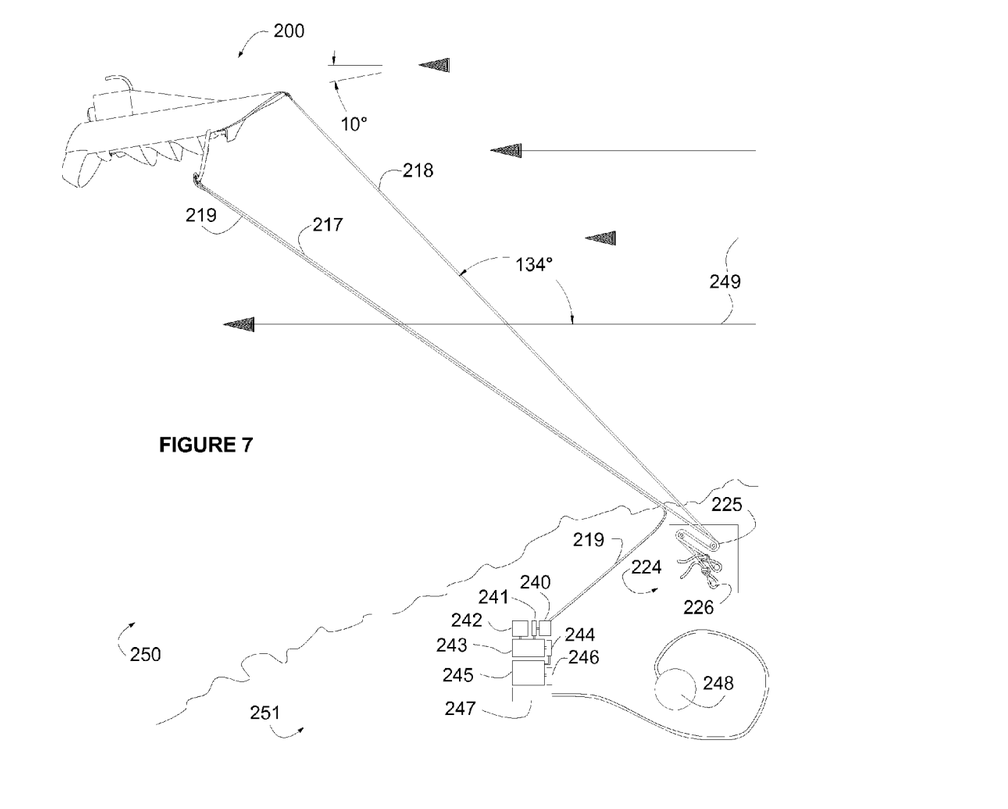
FIG. 7 is a system schematic diagram showing one possible way to tether the present invention in a flowing stream and an electrical system schematic showing one possible way of using electricity generated by the present invention.

Finally referring to FIG. 7, shows one possible way to tether the present invention in a flowing stream 250 from a land base 251 and also an electrical system schematic showing one possible way of using electricity generated by the present invention.

Tether line 219 connected to the tether bar 204 protruding from the device 200 at one end turns around a double pulley 225 and a second pulley of the same kind and having the other end tied to a cleat 226. In like manner tether line 218 connected to the bow stem at one end of device 200 turns around pulleys on shared axles and is tied to a cleat at the other end. Tension is adjusted on tether line 218 to bring the longitudinal axis of the device 200 to an angle of attack to approximately 7 to 12 degrees to the mainstream flow. A combined tension on the tether lines require a solid anchoring point which may include ratcheting reels to assist feeding out, reeling in and locking the tether lines. It will be recognized by those of skill in the art that many forms of pulleys, reels, ratchets, and locking devices may be implemented depending on operational requirements.

By way of example, facing the turbine rotor side of the device and having the bow pointing upstream an operator verifies the keel is on the bottom of the device and reposition if necessary. Tether line 217 is temporarily secured to an anchor point having a short length of slack to reach beyond existing eddies. The device is positioned on the bank downstream from the anchor point taking up the slack and pushed into the flow sliding on its keel and runner. An operator may then position the device 200 by increasing the length of tether lines and adjusting the tension. Tensioning the bow tether line 218 reduces the angle of attack and may be adjusted to the lowest angle possible for retaining a position in a particular flow 249. Tension on the bow tether line 218 beyond this balance point will cause the device to head into the mainstream, loose thrust and drift downstream to shore. Such a condition is desirable for retrieval or when the bow tether 218 comes in contact with floating objects in the mainstream flow.

To calculate an anchoring point to reach a desired area in a flow, again by way of example, an alternator operating under load in a flow velocity of approximately 3.5 feet per second having an angle of attack approximately 10 degrees using approximately 60 feet of tether length would locate the device approximately 48.5 feet downstream and approximately 35.3 feet into the mainstream flow. Actual results may vary with water environment and conditions. Efficiency of the turbine operation may be monitored by a voltage meter to suggest the optimum achievable angle of attack and tether length, in a particular flow from a chosen point of anchoring.

Cable 219 may be joined to tether line 217 to the anchoring area 224 or separated at a distance from the device to alleviate weight and drag on tether line 217. A 12 gauge AWG insulated three conductor cable 219 transmits three phase alternating current to a rectifier 240. One possible electrical scheme may comprise at least one bridge rectifier 240, a 15 amp breaker 241, a dump load 242, a charge controller 243, a 30 amp breaker 244, a battery 245, a direct current disconnect breaker 246 and an inverter 247. A 110 volt alternating current supplied by the inverter may be used to power an electrical device 248 within the output limitation of the inverter. It will be recognized by those skilled in the art that other electrical schemes may be used to fulfill 110 volt or, other power requirements. A specific electrical scheme forms no part of the present invention which includes any and all electrical schemes, systems and components.

It will be recognized that the embodiment described hereinabove may require additional mechanisms to protect device 200 from damage caused by debris or excessive flow velocities. Brakes, clutches, governors, shear pins, screens, or other such regulating and/or protecting devices known to those of skill in the art of course, may be added without deviating from the invention.

Since other modifications and changes varied to fit particular operating requirements and environments will be apparent to those skilled in the art, the invention is not considered limited to the examples chosen for the purpose of disclosure, and covers all changes and modifications which do not constitute departures from the true spirit and scope of the invention.

Having thus described the invention, what is desired to be protected by Letters Patent is presented in the subsequently appended claims.

What is claimed is:

1. A kinetic energy conversion hydrofoil, comprising:
   a) an elongated body having a predetermined height and comprising a first side and a first opposing side, a second side and a second opposing side, a tapered leading edge and a trailing edge of a plurality of flight components, said first and said first opposing sides being planarly asymmetrical and said second side and said second opposing sides being planarly symmetrical;

b) a bow stem disposed at said tapered leading edges;

c) a plurality of rails disposed along the length of said first side;

d) said first side comprising a turbine having a protruding shaft at a proximal end thereof and comprising bracketed bearings and a nacelle shield attached thereto and a protruding shaft at a distal end thereof comprising bracketed bearings, drive shaft linkages and a shield attached thereto, a semi-cylindrical shroud having sides disposed laterally at said plurality of rails, said semi-cylindrical shroud having a proximal end comprising a linear expansion nozzle disposed at said bow stem and a distal end comprising an annular cambered wing comprising a variable leading edge disposed at the distal end of said semi cylindrical shroud having a linear dimension greater than the linear dimension of an arc of said semi-cylindrical shroud at an angle within a range of 90 degrees to 135 degrees to an elongated flat laminar-flow plane, a variable width and a variable trailing edge disposed at the extremity of said elongated body; and e) said first opposing side of said elongated body comprising the elongated flat laminar-flow plane.

2. The kinetic energy conversion hydrofoil in accordance with claim 1 wherein said elongated flat laminar-flow plane comprises longitudinal sides and convex surfaces attached thereto, a proximal end disposed at said bow stem and a distal end comprising an adjustable nacelle and an alternator cowling attached thereto.

3. The kinetic energy conversion hydrofoil in accordance with claim 1 further comprising linear cylinder segments disposed at said symmetrical sides of said elongated body, said linear cylinder segments having sides disposed at said elongated flat laminar-flow plane and said linear cylinder segments having first and second opposite sides disposed at said symmetrical rails, said proximal ends tapering to said bow stem and an annular cambered wing connected to said distal ends.

4. The kinetic energy conversion hydrofoil in accordance with claim 1 further comprising a removable keel disposed longitudinally at one of said symmetrical sides of said elongated body.

5. The kinetic energy conversion hydrofoil in accordance with claim 1 further comprising an adjustable tether bar comprising an arc laterally disposed at a pivot point at said rails, protruding circumferentially around said turbine of said asymmetrical side of said elongated body.

6. The kinetic energy conversion hydrofoil in accordance with claim 1, further comprising:

f) an element chosen from a group: a supporting frame, an alternator, a drive shaft, a linkage, a bracket, an axial bearing, a thrust bearing, a tether line connection ring, a clamp, a sheer fastener, a pipe retainer, bracket/bearing shields and an insulated conductor cable, the element disposed within said elongated body.

7. The kinetic energy conversion hydrofoil in accordance with claim 1, wherein symmetrical rails comprise centrally inclined flat surfaces adjacent to an angle within a range of 85 degrees to 180 degrees to a horizontal axis having one side disposed at said semi-cylindrical shroud sides, transition surfaces comprising a diminished width and a parabolic curve having one side predispose at said linear expansion nozzle, distal ends disposed at said annular cambered wing and proximal ends disposed at said bow stem, having other sides disposed at convex surfaces of linear cylinder segments.

8. The kinetic energy conversion hydrofoil in accordance with claim 1, further comprising an adjustable tether bar comprising an arced pipe laterally disposed at said rails, protruding circumferentially around said semi-cylindrical shroud having pivot points at said rails and having ends extending within said elongated body disposed at angle adjustment retainers comprising sheer fasteners.

9. The kinetic energy conversion hydrofoil in accordance with claim 1, wherein said turbine, centrally positioned within said semi-cylindrical shroud, comprises, said proximal shaft end and a distal shaft end, said distal shaft end comprises said bracketed bearings, said drive shaft linkage and said shield disposed at the midline of the distal end of said semi cylindrical shroud, said proximal shaft end comprises said bracketed bearings and said nacelle shield disposed at the midline of the distal end of said linear expansion nozzle.

10. The kinetic energy conversion hydrofoil in accordance with claim 1, wherein said linear expansion nozzle comprises opposing symmetrical parabolic curves disposed to the said rails, said proximal end disposed at said bow stem and said distal end disposed at said semi cylindrical shroud, internal symmetrical semi-cylindrical ramps comprising a diameter equal to or less than the diameter of said semi-cylindrical shroud and an increased width within a range of 33% to 45% of the diameter of said semi-cylinder and a gradual radial taper to said bow stem.

11. The kinetic energy conversion hydrofoil in accordance with claim 1, wherein said laminar surface comprising a flat plane, having a radial proximal end and a height within a range of 25% to 85% of the height of said elongated body.

12. The kinetic energy conversion hydrofoil in accordance with claim 1, wherein a volume displacing an amount of water weighing within a range of 80% to 100% of the weight of said kinetic energy conversion hydrofoil.

13. A kinetic energy conversion hydrofoil, comprising:

an elongated body having a predetermined height and comprising a first side and a first opposing side, a second side and a second opposing side, a tapered leading edge and a trailing edge of a plurality of flight components, said first and said first opposing sides being planarly asymmetrical and said second side and said second opposing sides being planarly symmetrical;

a bow stem disposed at said tapered leading edges;

a plurality of rails disposed along the length of said first side;

said first side comprising a turbine having a protruding shaft at a proximal end thereof; and said first opposing side of said elongated body comprising an elongated flat laminar-flow plane comprising longitudinal sides and convex surfaces attached thereto, a proximal end disposed at a bow stem and a distal end comprising an adjustable nacelle comprising flat side planes adjacent to an angle within a range of 16 degrees to 24 degrees disposed perpendicularly to said flat laminar plane surface, a distal end disposed at an alternator cowling and a proximal end apex disposed perpendicularly at said flat laminar plane surface at a predetermined variable angle to the longitudinal axis ranging from zero degrees to plus or minus 12 degrees and the alternator cowling attached thereto.

14. The kinetic energy conversion hydrofoil in accordance with claim 13 further comprising linear cylinder segments disposed at symmetrical said second side and said second opposing sides of said elongated body, said linear cylinder segments having sides disposed at said elongated flat laminar-flow plane and said linear cylinder segments having first and second opposite sides disposed at said symmetrical rails, said proximal ends tapering to said bow stem and an annular cambered wing connected to said distal ends.

15. The kinetic energy conversion hydrofoil in accordance with claim 13 further comprising a removable keel disposed longitudinally at one of said symmetrical sides of said elongated body.

16. The kinetic energy conversion hydrofoil in accordance with claim 13 further comprising an adjustable tether bar comprising an arc laterally disposed at a pivot point at said rails, protruding circumferentially around said turbine of said asymmetrical side of said elongated body.

17. The kinetic energy conversion hydrofoil in accordance with claim 13, further comprising:
   g) an element chosen from a group: a supporting frame, an alternator, a drive shaft, a linkage, a bracket, an axial bearing, a thrust bearing, a tether line connection ring, a clamp, a sheer fastener, a pipe retainer, bracket/bearing shields and an insulated conductor cable, the element disposed within said elongated body.

18. The kinetic energy conversion hydrofoil in accordance with claim 13, wherein said symmetrical rails comprise centrally inclined flat surfaces adjacent to an angle within a range of 85 degrees to 180 degrees having one side disposed at semi-cylindrical shroud sides, transition surfaces comprising a diminished width and a parabolic curve having one side predispose at a linear expansion nozzle, distal ends disposed at an annular cambered wing and proximal ends disposed at said bow stem, having other sides disposed at said convex surfaces of linear cylinder segments.

19. The kinetic energy conversion hydrofoil in accordance with claim 13, wherein an adjustable tether bar comprises an arced pipe laterally disposed at said rails, protruding circumferentially around a semi-cylindrical shroud having pivot points at said rails and having ends extending within said elongated body disposed at angle adjustment retainers comprising sheer fasteners.

20. The kinetic energy conversion hydrofoil in accordance with claim 13, wherein said turbine, centrally positioned within a semi-cylindrical shroud, comprises, a proximal shaft end and a distal shaft end, said distal shaft end comprises bracketed bearings, a drive shaft linkage and a shield disposed at the midline of the distal end of said semi cylindrical shroud, said proximal shaft end comprises said bracketed bearings and said nacelle shield disposed at the midline of the distal end of a linear expansion nozzle.

* * * * *